Jan. 3, 1950     H. L. BERRY     2,493,437
SIGNAL DEVICE
Filed Oct. 11, 1946
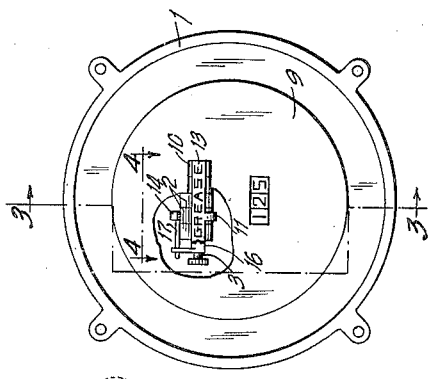
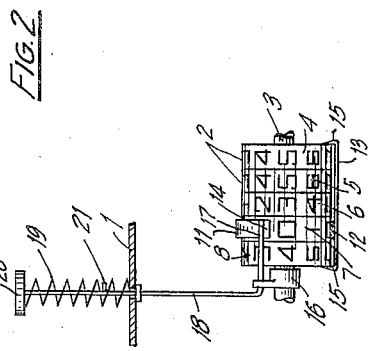
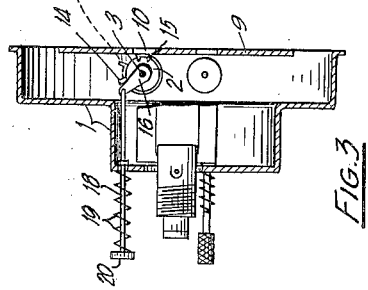
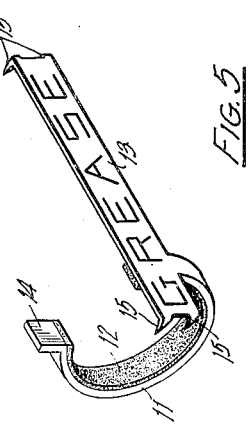
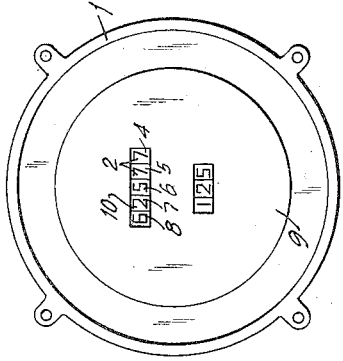
INVENTOR.
Howard L. Berry
BY
ATTORNEY Patented Jan. 3, 1950

2,493,437

UNITED STATES PATENT OFFICE 2,493,437

SIGNAL DEVICE

Howard L. Berry, Schenectady, N. Y.

Application October 11, 1946, Serial No. 702,774

4 Claims. (Cl. 116—114)

My invention relates to signaling devices and particularly to devices of this character for use in connection with a counting or measuring mechanism, such as an odometer, for giving a visible signal when a predetermined number of units has been counted or measured.

All present day automobiles are equipped with a speedometer in which is embodied a mileage meter, or odometer, for indicating the total mileage which the vehicle has traveled. Such odometers are merely counters of the well known type which comprises a plurality of coaxially-disposed disks, each having the numerals 0 to 9, inclusive, circumferentially arranged thereon, and which are operatively connected together and to the transmission of the vehicle by suitable gearing, and calibrated to indicate the mileage traveled by said vehicle.

Most motor vehicles, according to the manufacturers' instructions, should be greased and have the engine oil changed every thousand miles, and the principal object of my invention is to provide an extremely simple attachment for the odometer of the motor vehicle which is designed to give a visible signal to the operator thereof when the vehicle should be greased or some other operation performed. While my device is particularly adapted for attachment to motor vehicle odometers and I shall describe my invention in connection therewith, it will be perfectly obvious that the device may be applied to any counter of the odometer type for indicating when any even ten, hundred, thousand, or ten thousand units have been counted.

Referring to the drawing:

Fig. 1 is a front elevation view of a speedometer with the numerals and the hand indicating the speed omitted but showing both a totalizing odometer and a trip odometer;

Fig. 2 is a front elevation view of the speedometer with a portion of the face of the device in front of the totalizing odometer broken away to show details of my attachment;

Fig. 3 is a fragmentary section of Fig. 2 in the plane 3—3 with portions broken away, and portions which have nothing to do with my invention omitted;

Fig. 4 is a fragmentary plan view partially in section with parts broken away as viewed through the plane 4—4 of Fig. 2; and Fig. 5 is a perspective view of the signaling means.

Referring to the drawings:

1 is the casing of the speedometer in which a plurality of cylindrical disks 2 are rotatably mounted on a horizontal shaft 3 to form a totalizing odometer, the detailed construction of which is well known in the art, and therefore is not illustrated.

Where the odometer is equipped with a trip portion, as in the case of the speedometer illustrated, there is usually no disk indicating tenths of miles on the totalizing portion, and there are usually but five disks adapted to indicate mileages up to 99,999 miles without repeating. Thus the disk 4 is the unit disk, 5 is the tens disk, 6 is the hundreds disk, 7 is the thousands disk, and 8 is the tens of thousands disk. The odometer is ordinarily concealed by a front plate 9 except for a window 10 therein through which the mileage indicated by the odometer may be read.

My signaling device comprises an arcuate band 11, preferably, but not necessarily of metal, and preferably provided with a lining 12, such as a fabric, and which is adapted to extend partially around and frictionally to engage one of the disks of the odometer. In Figs. 2 and 4, the band is shown as engaging the thousands disk 7. Integral with or otherwise secured to the band 11, is the strip 13, which may be colored, or may carry on its face the word "Grease", or some other suitable designation, and which is of a length adapting it to be readily noticed when behind the window 10, as shown in Fig. 2. The other end of the band 11 is bent upwardly to form a radially-extending projection 14. Small fingers 15 adapted to extend over the ends of the disk assembly may be provided on the end of the strip 13 if desired but are not actually necessary. Since the band 11 frictionally engages the thousands disk 7, it will be apparent that each time the thousands disk moves, as in changing its reading from 2 to 3 thousand, the band 11 and the strip 13 will be carried with it and move $\frac{1}{10}$ of a complete revolution.

Freely rotatable on the shaft 3 is a crank 16, the free end of which is perforated to receive the hooked end 17 of the resetting lever 18 which extends through the back of the casing 1, as shown in Figs. 3 and 4. The lever 18 is normally held in the position shown in Fig. 3 by means of the light spring 19 which is compressed between the outside back of the casing and the knob 20 which is provided on the end of the resetting lever 18 for manipulating the same. A stop 21 may be provided on the lever 18, if desired. When the lever 18 is pushed inwardly the hooked end 17 thereof cooperates with the projection 14 to slide the band 11 around the disk 7 to the position shown at 14′ in Fig. 3. This pushes the strip 13 downwardly around the disk 7 so that it is no longer visible through the window 10, and, to insure that the strip is moved backwardly only one unit, some movement limiting means, such as the stop 21 (see Fig. 4) on the lever 18, may be provided. However, when the thousands disk moves one unit upwardly, it carries the band 11 and the strip 13 with it and brings the signal "Grease" up into view through the window 10, as shown in Fig. 2.

While I have shown the band 11 as frictionally driven by the thousands disk, it is obvious that it might be driven by any of the disks depending upon the mileage interval desired between the appearances of the signal. By arranging the resetting mechanism so that the band 11, in resetting, is turned two or more units relative to the disk which drives it, the device can be arranged to have the signal appear only every two thousand or three thousand miles, as desired.

The lining 12 in the band 11 serves not only to provide good frictional engagement of the band with the disk which drives it without scratching the face of the disk, but also to maintain the strip 13 in slightly radially spaced relation to the other disks so that the strip 13 does not interfere with the turning thereof, nor does the turning of the other disks affect the strip 13; it being understood that the fingers 15 at the ends of the strip 13 merely extend over the edge of the disk assembly but do not contact said edge.

What I claim is—

1. A signal device comprising a resilient, arcuate band adapted to be slipped over and frictionally to engage the exterior surface of one of the rotatable mileage indicating disks of an odometer throughout a circumferential portion of said disk substantially in excess of 180° but substantially less than 360°; whereby said band will be rotated when said disk is rotated; and a signal carrying arm attached to said band adjacent one end thereof and extending therefrom substantially parallel to the axis of rotation of said disk when said band is secured to said disk.

2. The combination with an odometer comprising a casing having a plurality of coaxially-disposed disks rotatably mounted therein and having circumferentially-spaced numerals from 0 to 9 inclusive, thereon for indicating the total mileage measured by said odometer in units, tens, hundreds, and thousands, and a window in said casing through which the total mileage indicated by said odometer may be read, of a resilient, arcuate band partially surrounding and frictionally engaging one of said disks; whereby it is adapted to move with said one disk and be moved relative to said one disk; a signal arm attached to said band; said arm being normally disposed adjacent said window in a position to be moved into view through said window when said one disk moves; and manually actuated means cooperating directly with said band for resetting said signal by moving said band relative to said one disk into its normal position aforesaid.

3. A signal device comprising a resilient, arcuate band adapted to be slipped over and frictionally to engage the exterior surface of one of the rotatable mileage indicating disks of an odometer throughout a circumferential portion of said disk substantially in excess of 180° but substantially less than 360°, and having a signal indicating means thereon adjacent one end thereof; whereby said band will move when said disk moves, and also may be moved relative to said disk.

4. The combination with a counting device comprising a casing having a plurality of coaxially-disposed disks rotatably mounted therein and having circumferentially-disposed numerals from 0 to 9, inclusive, thereon for indicating the total counted by said device, and a window in said casing through which the total indicated by said counting device may be viewed, of a signaling means in said casing comprising a resilient, arcuate band surrounding and frictionally engaging that surface of one of said disks having said numerals thereon throughout a circumferential portion thereof substantially in excess of 180° but less than will conceal all of said numerals; whereby, said band will rotate with said disk and may also be rotated relative to said disk; a signal on said band adjacent one end thereof, and a rod extending through said casing and cooperating directly with said band for moving said signal out of view to effect a resetting thereof after it has been brought into view through said window by a movement of said one disk.

HAROLD L. BERRY.

REFERENCES CITED

The following references are of record in the file of this patent:

UNITED STATES PATENTS

| Number | Name | Date |
| --- | --- | --- |
| 1,761,950 | Zubaty | June 3, 1930 |
| 1,872,838 | Smith | Aug. 23, 1932 |
| 1,891,335 | Reisinger, Jr. | Dec. 30, 1932 |
| 1,948,946 | Smith et al. | Feb. 27, 1934 |
| 2,130,613 | Colee | Sept. 20, 1938 |
| 2,253,827 | Vinton | Aug. 26, 1941 |
| 2,260,541 | Schwenn | Oct. 28, 1941 |